(12) United States Patent
Brunnschweiler et al.

(10) Patent No.: US 6,776,254 B1
(45) Date of Patent: Aug. 17, 2004

(54) HIGH-EFFICIENCY TUBULAR ELECTRICAL STEERING SERVO

(75) Inventors: Daniel Brunnschweiler, Fläsch (CH); Magnus Alfredsson, Neukirch (CH); Stefan Battlogg, St. Anton im Montafon (AT)

(73) Assignee: Thyssen Krupp Presta AG, Eschen (LI)

( * ) Notice: Subject to any disclaimer, the term of this patent is extended or adjusted under 35 U.S.C. 154(b) by 0 days.

(21) Appl. No.: 10/129,996

(22) PCT Filed: Nov. 9, 2000

(86) PCT No.: PCT/CH00/00595

§ 371 (c)(1),
(2), (4) Date: Oct. 1, 1999

(87) PCT Pub. No.: WO01/40046

PCT Pub. Date: Jun. 7, 2001

(30) Foreign Application Priority Data

Dec. 1, 1999 (CH) ............................................. 2197/99

(51) Int. Cl.⁷ ................................................. B62D 5/04
(52) U.S. Cl. .................................... 180/444; 74/424.82
(58) Field of Search ................................ 180/444, 443, 180/446; 74/388 PS, 424.81, 424.82

(56) References Cited

U.S. PATENT DOCUMENTS

| | | | | |
|---|---|---|---|---|
| 5,437,349 A | * | 8/1995 | Kurahashi et al. | 180/446 |
| 5,590,732 A | * | 1/1997 | Sugino et al. | 180/444 |
| 6,082,483 A | * | 7/2000 | Taniguchi et al. | 180/444 |
| 6,186,268 B1 | * | 2/2001 | Onodera et al. | 180/444 |
| 6,237,713 B1 | * | 5/2001 | Onodera et al. | 180/444 |

FOREIGN PATENT DOCUMENTS

| | | | |
|---|---|---|---|
| DE | 10011140 | * | 11/2000 |
| EP | 0101579 | * | 2/1984 |
| GB | 2284790 | * | 6/1995 |

* cited by examiner

Primary Examiner—Anne Marie Boehler
(74) Attorney, Agent, or Firm—Notaro & Michalos P.C.

(57) ABSTRACT

The invention relates to a steering servo for motor vehicles, with a drive unit arranged coaxially with the rack arrangement, which comprises a combination of a tubular electrical motor (9, 10, 12), with a recirculating-ball spindle drive. A particularly compact and cost-effective steering servo arrangement with few components is permitted, whereby the ball nut (7) of the recirculating-ball drive is mounted coincidentally with the rotor (9), which is arranged as an external rotor.

18 Claims, 2 Drawing Sheets

HIGH-EFFICIENCY TUBULAR ELECTRICAL STEERING SERVO

BACKGROUND OF THE INVENTION

The invention relates to a steering booster configuration for motor vehicles according to the preamble of claim 1.

Known servo steering systems are operated, for example hydraulically supported, thereby that on the steering shaft the control torque generated by the driver is measured and therewith via a hydraulic system a piston is driven which acts upon the transverse toothed rack of the steering system, which is a portion of a thrust rod and thus generates a force augmentation depending on the deflection of the steering wheel. Such electrohydraulic systems have the disadvantage that at high vehicle speeds, where per se the least servo force augmentation is required, the greatest hydraulic power is obtained and during standstill of the motor vehicle the force augmentation steeply decreases, where the greatest steering forces would be required.

Attempts have therefore been made to realize steering booster configurations which drive the toothed rack directly with an electromotor. Such systems save space and energy since the electromotor is only activated when needed. With electromotor-driven steering booster configurations it would be possible to provide the auxiliary force supply at the correct point in time, for example correspondingly more strongly when the motor vehicle is not moving.

U.S. Pat. No. 5,711,396 for example discloses an electromotor-driven servo drive, which acts directly onto the toothed rack of the steering system. In order to be able to generate sufficiently high forces, a correspondingly robust electromotor is provided which requires corresponding strong stepping-down in order to generate sufficiently high controlling forces. In the prior cited patent the electromotor was disposed laterally to the toothed rack or thrust rod, which drives a ball spindle gear which is disposed coaxially with the toothed rack axis and serves as a reduction gear. Of disadvantage in this configuration is that the motor and the gear disposition are of a complicated structure and occupy a relatively large installation space. In addition, the efficiency is not particularly high. To save installation space, attempts have also been made to dispose recirculating ball gears together with the electromotor coaxially on the toothed rack axis, such as has become known for example from GB 2 284 790. A further coaxial configuration was disclosed in EP 0 101 579. The configurations known until today have the disadvantage that their structure is relatively complicated, in particular in the proximity of the bearing of the ball nut and of the motor rotor. Due to the limited efficiencies of the electrically operated servo steering configuration, the application field is also limited since these also demand high electric feed power of the electromotor. The available electric power of the onboard network of a motor vehicle is limited. In addition, the previous steering boosters are insufficiently compact, which also limits utilization in small motor vehicles or makes them not economical.

SUMMARY OF THE INVENTION

The task of the present invention resides in eliminating the disadvantages of the above cited prior art. The task resides in particular in realizing an electric steering booster for a steering configuration, which is structured extremely compactly and which permits attaining rapid response behavior with good dynamics with responsive steering behavior for the driver, which operates at high efficiency and which can generate large controlling forces acting directly onto the thrust rod or toothed rack and which can be produced economically. The configuration, moreover, is to be highly compact and is to have the capacity of being disposed tubularly coaxially with respect to the axis of the thrust rod.

The task is solved according to the invention by the configuration according to the characteristics of claim 1. The dependent claims define further advantageous embodiments.

The task is solved according to the invention thereby that an electromotor disposed coaxially to the thrust rod axis drives with its rotor a rotation-translation converter. This comprises a ball-threaded nut, which, in turn engages a threaded coupling disposed in a subregion of the thrust rod. The rotatable nut, or the rotor, are rotatably supported with only one bearing and this is stationarily braced against the motor vehicle chassis, such that upon torquing of the nut it causes an axial displacement of the thrust rod, wherewith a corresponding force acts onto the thrust rod. The nut and the thrust rod act like a gear for the force transmission. The advantage of this configuration comprises that the rotor of the motor is coupled directly with the ball-threaded nut of the rotation-translation converter and only one bearing is required.

As the rotation-translation force converter the already known recirculating ball spindle gears or recirculating-ball worm gears are especially suitable. In such configurations the balls, which roll along between the nut and the threaded turn of the threaded rod, for example in an endless loop, are guided back again to their original position. An especially suitable configuration of a recirculating-ball worm gear is available for example from the company Amsler & Co AG in CH-8245 Feuerthalen with the type designation "Star" and the name 'Kugelgewindetrieb' (ball screw). With this model an especially compact, precise converter configuration with high efficiency can be attained. The utilization of a special, electronically commutating motor with bell-like rotor, moreover, permits the use of a single bearing for the bearing support of the ball-threaded nut together with the bell-like rotor. The electromotor disposed coaxially with the toothed rack or thrust rod axis is developed such that the stator with its winding coaxially encompasses the thrust rod axis and the rotor, preferably tubularly, encompasses rotatably supported the stator thereover. The rotor carries permanent magnets of the type rare earths and is developed as a bell-form rotor, which is supported on one side together with the ball-threaded nut. With such a configuration high degrees of efficiency can be attained with compact implementation.

The force transmission ratio of the rotation-translation converter and of the motor is laid out such that high controlling forces can be generated, preferably up to more than 9 kN with rapid reaction times, which is of particular importance for the steering safety. The motor is frequency-controlled according to the desired requirements via an electronic power stage, wherein the driving frequency lies preferably above the range of the human audibility limit. The power stage is driven by a control unit, which processes as instantaneous value signal the torque measured on the steering shaft, which is generated during the steering with respect to the toothed rack, for this purpose for example a torsion rod is disposed between the steering gearing and the steering shaft and its deformation under the effect of force is measured. The control can with advantage be provided with a corresponding characteristic or transfer function in order to be able to generate the desired control characteristics at different operating behavior. For example, the speeddependent and weight-dependent control force behavior can be taken into consideration and be compensated. Furthermore, with advantage the resetting of the front wheels upon releasing the steering wheel can be supported and/or irregularities of the steering joint, for example due to a universal joint error, can be compensated and/or rotational vibrations of the steering system can be actively damped. The electronically controlled motor permits, moreover, to equalize certain negative properties of the motor, such as for example residual ripple behavior or also fabrication tolerances, thereby that, for example, the motor power is compensatingly modulated either through fixed presetting or by measuring the effect via sensors and integration into a programmed control system. The control is advantageously developed as programmable control, for example as a microprocessor system, which can be defined through software or also through fixedly integrated, stored programs. With the motor converter configurations according to the invention good overall degrees of efficiency with compact structure and with high controlling forces can be achieved without overloading of the onboard network.

BRIEF DESCRIPTION OF THE DRAWINGS

In the following the invention will be explained in further detail by example with schematic Figures. Therein depict.

Figure 1:
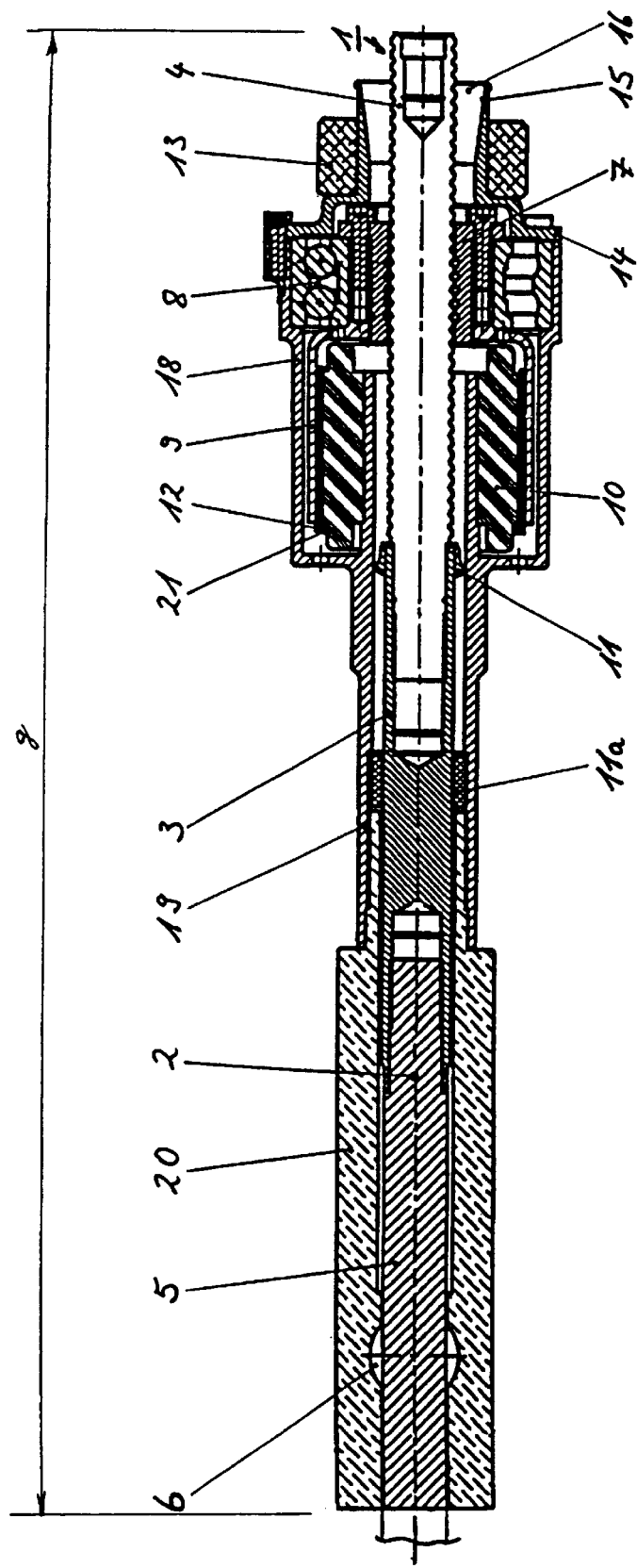
FIG. 1 schematically and in cross section a steering booster configuration according to the invention, FIG. 2 schematically and in cross section an enlarged configuration according to FIG. 1 of the motor converter configuration.
Figure 2:
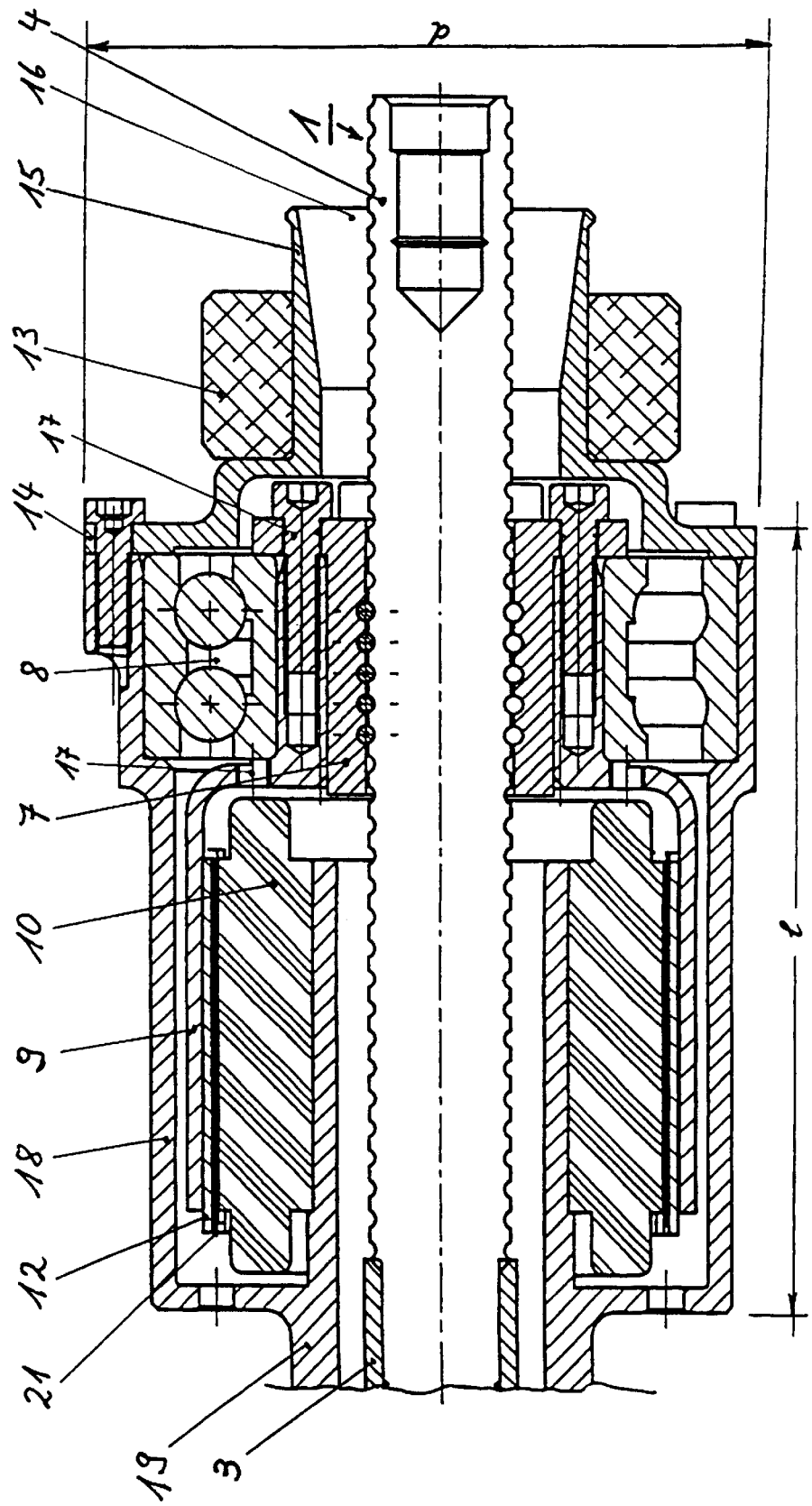

In the Figures is depicted schematically and in section a steering booster configuration according to the invention with an axially displaceable toothed rack configuration 1 and a coaxially disposed electromotor driving unit. The toothed rack configuration 1 is disposed in a motor vehicle in known manner such that it is coupled at its ends to the steerable wheels, for example across so-called steering tie rods, which, with the wheels, which are rotatably supported, can be pivoted through back and forth motion during steering such that the wheels experience a corresponding steering turning. The toothed rack configuration 1 comprises a first section 2, on whose rack subregion are disposed teeth 5, which engage a pinion 6 driven via the steering shaft by the control (steering) wheel during the steering process. This first rack subregion 2 with the teeth 5 forms together with the pinion 6 the steering gearing 20 accommodated in a casing 20. Between the pinion 6 and the control wheel during the torquing a force action is generated which is acquired with measuring means and the resulting signal is evaluated and correspondingly via a control configuration or a regulation circuit configuration conducted to a motor driving device which, in turn, couples the force onto the toothed rack configuration 1 in order to permit in this way an easier steering process.

DESCRIPTION OF THE PREFERRED EMBODIMENTS

The first rack subregion 2 is continued via an intermediate piece 3 connecting the toothed rack subregion 2 with the second rack subregion 4, with this rack portion 4 being developed as a ball spindle and constituting a component of the drive. The outer end of the first rack portion 2 and of the second rack portion 4 in the installed state in the motor vehicle is operationally connected with the pivotable wheels. On the second rack portion or on the ball spindle is disposed a ball nut 7 coaxially encompassing such, which nut is supported rotatably about the rack axis with a bearing configuration 8, such that the nut 7 is arrested in the axial direction with respect to the installation position and thus relative with respect to the chassis in the direction axial to the rack configuration 1. When torquing the ball nut 7 thus the radial forces and the axial forces are absorbed on the shortest path and conducted into the casing 18, which encompasses the bearing and the motor. The torquing of the ball nut 7 thus causes a longitudinal displacement of the ball spindle 4 and thus of the toothed rack configuration 1. The bearing configuration 8 advantageously comprises a highly loadable ball bearing, for example a double-row inclined ball bearing or also a four-point, rolling or deep groove roller bearing.

The electromotor is developed as an electronically commutated motor and comprises a stator 10, which is developed as an electric winding and is stationarily disposed directly next to the ball nut 7 and coaxially encompasses the toothed rack configuration 1. This stator winding 10 can be disposed, for example, on a casing portion 18 which in the form of a tube encompasses the toothed rack configuration, and can simultaneously serve as protective tube or connection tube between steering gearing casing 20 and the motor converter casing 18. As already described, the stator winding 10 is supplied from an electronic control or regulation unit. The rotor 9 of the electromotor is advantageously developed in the form of a tube or a bell as external rotor and supported directly together with the ball nut 7 via the bearing configuration 8. The rotor 9 carries permanent magnets with a high energy product of the type rare-earths magnets, preferably of the type cobalt-samarium or neodymium.

Between rotor 9 and stator 10 is provided an active air gap 21 of less than 2 mm, the air gap should preferably be <1.5 mm in order to attain especially good efficiencies. The air gap width tolerance is herein ≦10% compared to the average air gap width dimension in order to permit sufficiently good synchronization properties and thus sufficiently good steering behavior.

With respect to the end side of the second rank portion 4 the casing 18 is advantageously provided with a connecting fitting 15 which forms a coaxial opening 16 encompassing the ball spindle 4, and thus permits an air entry opening to the motor region. On this connecting fitting 15 is disposed, for example, a protective rubber bellows, which during the back and forth motion of the toothed rack configuration 1 exerts a type of pumping action for air and thus makes possible through openings or recesses 17 in the proximity of the bearing configuration 8, to move air in particular through the motor air gap 21. This causes the efficient cooling of the configuration with less expenditure.

The connection tube portion 19 which encompasses the intermediate piece 3 of the toothed rack configuration 1, is developed advantageously on the inner tube surface as a slide surface, along which a bracing element 11 disposed on the intermediate piece 3 can be slid during the back and forth motion of the rack configuration 1. This bracing 11 effects a prevention of the tilting of the ball spindle rod portion 4, as a consequence of the efficiency would be impaired due to a type of jamming in the ball-threaded spindle converter.

The bracing 11 is advantageously provided with slide material in the region of the running surfaces, such as with suitable synthetic materials or corresponding slide bushings. But the bracing can also take place with a bracing element 11a, disposed stationarily on the inner tube 19, and in this case the slide surface is developed on the intermediate piece 3. Possible is also a combination of both types of bracings.

On connecting fitting 15 connected with casing 18 is advantageously provided the fastening of the steering booster configuration with respect to the chassis, for example with a rubber ring damper configuration 13 and a holding shackle.

The configuration can be realized with high efficiency highly compact and economical with very few parts. Compact motor converter dimensions are readily possible of less than 120 mm diameter d at a length 1 of less than 140 mm corresponding to the embodiment according to the invention. With these dimensions a spindle stroke of approximately 2×70 mm, which means overall of 140 mm, is possible, with the spindle diameter being in the range of 24 mm at a threaded spindle pitch of 5 to 10 mm. The axial force on the spindle herein reaches at least 9000 N at a rotation rate of the motor of up to maximally 800°/s and a torque of the electromotor of up to 10 Nm.

The steering booster configuration according to the invention comprises substantially very few structural parts such as the stator 10, the rotor 9 with the magnets 12, the bearing configuration 8, the casing 18 with the casing cover, the ball nut 7 and the ball spindle portion 4 or the toothed rack configuration 1. Due to the high integration of the structural parts, not only the size of the motor converter configuration as stated is very small, but rather also the overall length g of the toothed rack configuration 1 from one end of the steering gearing casing to the other end of the rack configuration 1, is for example 650 mm. Moreover, through the small number of structural parts the cumulative tolerance is minimal, which makes possible the precise production at justifiable costs and enhances the high efficiency of the configuration.

The various features of novelty which characterize the invention are pointed out with particularity in the claims annexed to and forming a part of this disclosure and are entirely based on PCT/CH00/00595 and the Swiss priority application no. 2179/99.

What is claimed is:

1. A steering booster configuration for pivoting wheels of a steerable motor vehicle in response to rotation of a steering wheel, the steering booster configuration comprising:
   a toothed rack configuration (1) which is movable to cause pivoting movement of the motor vehicle wheels, the rack configuration comprising three subregions: a first rack subregion (2) with teeth (5), an intermediate region (3), and a second rack region (4) which is formed as a ball spindle (4);
   a configuration with a pinion (6), which is rotatable with the steering wheel and engages the teeth (5) of the first rack portion (2) in order to apply a steering force onto the toothed rack configuration;
   a ball nut (7) engaging the ball spindle (4), and being rotatably supported with a bearing configuration (8) with respect to a casing (18); and
   an electromotor configuration (9, 10, 12) with a stator (10) disposed coaxially with the rack configuration (1) and a rotor (9), with the rotor (9) being operationally connected with the ball nut (7), characterized in that the bearing configuration (8) has a single bearing (8) for the unilateral bearing of the rotor (9), the rotor (9) and the ball nut (7) together being rotatably supported by the bearing (8).

2. The steering booster configuration of claim 1, wherein the rotor (9) is formed bell-shaped.

3. The steering booster configuration of claim 1, wherein the electromotor configuration (9, 10, 12) is formed as an electronically commutated motor configuration.

4. The steering booster configuration of claim 1, wherein the stator (10) is disposed stationary on a side facing the rack configuration (1), and the stator (10) is formed as a winding.

5. The steering booster configuration of claim 1, wherein the rotor (9) is equipped with permanent magnets (12).

6. The steering booster configuration of claim 5, wherein the permanent magnets (12) are rare-earth magnets selected from the group consisting of cobalt-samarium and neodymium magnets.

7. The steering booster configuration of claim 1, wherein, between said rotor (9) and said stator (10), an air gap of $\leq 2$ mm is provided, and the air gap width tolerance is $\leq 10\%$ of the air gap width.

8. The steering booster configuration of claim 7, wherein the air gap width is $\leq 1.5$ mm.

9. The steering booster configuration of claim 1, wherein in the proximity of the intermediate region (3) slidable bracing means (11, 11a) are provided disposed between the intermediate region (3) and a guide tube portion (19).

10. The steering booster configuration of claim 1, wherein the bracing means (11, 11a) are provided in the proximity of contact surfaces fitted with a slide material formed of synthetic material or slide sintered materials.

11. The steering booster configuration of claim 1, wherein in the proximity of the bearing configuration (8) air penetration openings (16, 17) are provided for the through-conduction of cooling air through an air gap (21).

12. The steering booster configuration of claim 1, wherein the bearing configuration (8) is a rolling bearing.

13. The steering booster configuration of claim 12, wherein the bearing configuration is an inclined ball bearing.

14. The steering booster configuration of claim 13, wherein the inclined ball bearing is formed in double-rows.

15. The steering booster configuration of claim 1, wherein the ball nut (7) is a recirculating ball nut.

16. The steering booster configuration of claim 1, wherein the electromotor configuration (9, 10, 12) with the nut (7) and the bearing configuration (8) has a maximum diameter (d) of 120 mm and a maximum length (l) of 140 mm.

17. The steering booster configuration of claim 1, wherein measuring means for the torque measurement during rotation of the steering wheel are provided and these are operationally connected with a control and/or regulation appliance with the electromotor configuration (9, 10).

18. The steering booster configuration of claim 17, wherein the control and/or regulation appliance includes a program control for defining or tracking a presettable transmission characteristic.

* * * * *